(12) United States Patent
Zhang et al.

(10) Patent No.: US 12,418,932 B2
(45) Date of Patent: Sep. 16, 2025

(54) METHOD PERFORMED BY USER EQUIPMENT, AND USER EQUIPMENT

(71) Applicant: Sharp Kabushiki Kaisha, Sakai (JP)

(72) Inventors: Chongming Zhang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 350 days.

(21) Appl. No.: 17/772,189

(22) PCT Filed: Sep. 1, 2020

(86) PCT No.: PCT/CN2020/112803
§ 371 (c)(1),
(2) Date: Apr. 27, 2022

(87) PCT Pub. No.: WO2021/088485
PCT Pub. Date: May 14, 2021

(65) Prior Publication Data
US 2022/0417949 A1    Dec. 29, 2022

(30) Foreign Application Priority Data
Nov. 5, 2019    (CN) .......................... 201911074677.9

(51) Int. Cl.
*H04W 72/54* (2023.01)
*H04W 72/1263* (2023.01)
(Continued)

(52) U.S. Cl.
CPC ....... *H04W 72/54* (2023.01); *H04W 72/1263* (2013.01); *H04W 72/20* (2023.01); *H04W 80/02* (2013.01)

(58) Field of Classification Search
CPC . H04W 72/54; H04W 72/1263; H04W 72/20; H04W 80/02; H04W 4/40; H04W 72/25; H04W 92/18; H04L 5/0075
See application file for complete search history.

(56) References Cited

U.S. PATENT DOCUMENTS

2017/0170940 A1    6/2017   Lee et al.
2018/0027549 A1*   1/2018   Wang .................... H04L 5/0044
                                                               370/329
(Continued)

FOREIGN PATENT DOCUMENTS

| CN | 106170942 A | 11/2016 |
| CN | 110113818 A | 8/2019 |
| WO | 2019077749 A1 | 4/2019 |

OTHER PUBLICATIONS

On Physical Layer Procedures for NR V2X Sidelink (Year: 2019).*
(Continued)

*Primary Examiner* — Jung H Park
(74) *Attorney, Agent, or Firm* — Keating & Bennett, LLP (57) ABSTRACT

Provided in the present invention is a method performed by user equipment, and user equipment. The method performed by user equipment is a method, performed by user equipment, for determining address information to which a CSI report belongs or corresponds. The method includes the following steps: carrying, by user equipment, a CSI request trigger in SCI, and scheduling transmission of a PSSCH carrying a TB in the SCI, wherein the TB includes an MAC PDU, and an MAC subheader of the MAC PDU includes address information; receiving, by another user equipment, the SCI, receiving the transmission of the PSSCH according to the information in the SCI, and decoding the TB; and generating, by another user equipment, a CSI report,
(Continued)

wherein address information of the CSI report is determined by the address information of the CSI request trigger corresponding to the CSI report.

2 Claims, 2 Drawing Sheets

(51) Int. Cl.
*H04W 72/20* (2023.01)
*H04W 80/02* (2009.01)

(56) References Cited

U.S. PATENT DOCUMENTS

| | | | |
|---|---|---|---|
| 2019/0207662 A1* | 7/2019 | Zhou | H04W 72/0446 |
| 2019/0215897 A1 | 7/2019 | Babaei et al. | |
| 2020/0336227 A1 | 10/2020 | Takeda et al. | |
| 2020/0383119 A1 | 12/2020 | Sun et al. | |
| 2021/0099902 A1* | 4/2021 | Takeda | H04W 24/10 |
| 2021/0321385 A1* | 10/2021 | Lee | H04B 17/24 |
| 2021/0392620 A1* | 12/2021 | Ashraf | H04W 72/02 |
| 2022/0014338 A1* | 1/2022 | Yoshioka | H04W 8/005 |

OTHER PUBLICATIONS

Ericsson, "Support of Unicast, Groupcast and Broadcast on the NR Sidelink", 3GPP TSG-RAN WG1 Meeting #94-Bis, R1-1811591, Oct. 2018, pp. 1-9.

\* cited by examiner

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

Vehicle to Everything (V2X) is a new generation of information and communication technology that connects vehicles with everything, in which V stands for vehicle, and X stands for any object that exchanges information with the vehicle, and X currently mainly includes vehicles, persons, traffic roadside infrastructure, and networks.

For a pair of UE performing V2X service communication, for example, UE A and UE B, in order to acquire link quality information, UE A may request UE B to report CSI. Based on the CSI request, UE B will generate a corresponding CSI report, and transmit the CSI report to UE A. The CSI report may also be carried in an MAC CE, the MAC CE may be referred to as a CSI report MAC CE, and then the MAC CE is encapsulated in an MAC PDU and is transmitted through a PSSCH.

When encapsulating a MAC PDU including the CSI report MAC CE, the UE (UE B) transmitting the CSI report needs to know the exact address information of the MAC PDU and carry the address in a subheader of the MAC PDU, including a source address and a destination address, then how the UE determines the address information to which the CSI report belongs is a problem to be solved.

In addition, the CSI report has a valid period, so when the UE (UE A) initiating the CSI request receives a CSI report, how to determine the validity thereof is also a problem to be solved.

SUMMARY

An objective of the present invention is to provide a solution for the problem of how UE determines address information to which a CSI report belongs and the problem of the timeliness of the CSI report.

According to one aspect of the present invention, provided is a method performed by user equipment for determining address information to which a channel state information (CSI) report belongs or corresponds. The method comprises the following steps: carrying, by user equipment UE A, a CSI request trigger in sidelink control information (SCI), and scheduling transmission of a physical sidelink shared channel (PSSCH) carrying a transfer block (TB) in the SCI, wherein the TB comprises a medium access control protocol data unit (MAC PDU), and an MAC subheader of the MAC PDU comprises address information; receiving, by another user equipment UE B, the SCI, receiving the transmission of the PSSCH according to the information in the SCI, and decoding the TB; and generating, by the UE B, a CSI report, wherein address information of the CSI report is determined by the address information of the CSI request trigger corresponding to the CSI report.

In the method performed by user equipment, preferably, if the TB is decoded successfully, the UE B further determines the address information, and then associates the address information with the CSI report trigger carried in the SCI, thereby determining the address information to which the CSI report trigger belongs or corresponds; and if the TB is not decoded successfully, the UE B cannot determine the address information, thereby determining that the CSI request trigger is an invalid CSI report trigger, or cancelling the CSI report trigger.

In the method performed by user equipment, preferably, when the TB has a corresponding CSI request trigger, if the TB is not decoded successfully, the CSI request trigger is cancelled; and if the TB is decoded successfully, it is determined that the CSI request trigger is valid, and the address information associated/bound with the CSI request trigger is further determined on the basis of the address information in the MAC PDU carried by the TB.

In the method performed by user equipment, preferably, when it is determined that there is at least one CSI request trigger that is valid or not cancelled, and when an MAC entity of the UE acquires a sidelink resource for the first transmission or a new transmission and an address that the resource can use for transmission is the same as or corresponds to the address bound with or corresponding to the CSI request trigger, information of the CSI report corresponding to the CSI request trigger is acquired from a lower layer, and a multiplexing and assembly entity is instructed to generate a CSI report MAC control element (CSI report MAC CE).

According to another aspect of the present invention, provided is a method performed by user equipment (UE) for determining address information to which a channel state information (CSI) report belongs or corresponds. The method comprises the following steps: carrying, by user equipment UE A, a CSI request trigger in sidelink control information (SCI), and further carrying a layer-1 ID in the SCI, wherein the layer-1 ID is configured by a radio resource control (RRC) signaling, or is calculated on the basis of a layer-2 ID; generating, by another user equipment UE B, a CSI report corresponding to the CSI request trigger, and indicating/transmitting the CSI report and the layer-1 ID and/or layer-2 ID carried in the SCI to an upper layer; and determining address information of the CSI report based on the indicated layer-1 ID or layer-2 ID.

In the method performed by user equipment, preferably, after the address information corresponding to the CSI report is determined, the UE indicates the address information corresponding to the CSI report while generating the CSI report and indicating/transmitting the CSI report to an upper layer; and when the upper layer receives the CSI report indicated by the lower layer, a multiplexing and assembly entity is instructed to generate a CSI report MAC CE.

In the method performed by user equipment, preferably, when the UE acquires a sidelink/vehicle to everything (V2X) resource, an address that the resource can use for transmission is firstly determined.

In the method performed by user equipment, preferably, when the UE acquires the sidelink/V2X resource, if the UE needs to transmit a CSI report or a CSI report MAC CE to a certain address, or if there is a CSI report trigger that is valid or not cancelled and an address corresponding thereto is the same as or corresponds to the certain address, the certain address is used as a candidate address of the resource.

In the method performed by user equipment, preferably, if the UE also needs to transmit service data to a certain address, and the service data respectively belongs to one or a plurality of logical channels and each logical channel has a logical channel priority corresponding thereto, then the highest priority is selected as the priority corresponding to the certain address.

According to yet another aspect of the present invention, provided is user equipment, comprising: a processor; and a memory storing instructions, wherein the instructions, when run by the processor, cause the user equipment to perform the method described above.

According to the method performed by user equipment, and the corresponding user equipment of the present disclosure, the address information to which a CSI report belongs can be determined, and the timeliness of the CSI report can also be considered.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
Sidelink
V2X: Vehicle to Everything
MAC: Medium Access Control
MAC CE: MAC Control Element
LCID: Logical Channel Identity
PDU: Protocol Data Unit
SDU: Service Data Unit
PSSCH: Physical Sidelink Shared Channel
PSFCH: Physical Sidelink Feedback Channel
SCI: Sidelink Control Information
PSCCH: Physical Sidelink Control Channel
QoS: Quality of Service
SL-SCH: Sidelink Shared Channel
CSI: Channel State Information
CSI RS: CSI reference signalling
RRC: Radio Resource Control
HARQ: Hybrid Automatic Repeat Request
ID: Identity The terms "associated", "corresponding", and "corresponding to" herein may be replaced with each other.

The two terms sidelink and V2X sidelink herein may interchangeable.

There is at least one pair of UE: UE A and UE B herein. The UE A initiates a CSI request, that is, the UE A transmits information to the UE B and requests the UE B to transmit a CSI report to the UE A, and the request information may be referred to as a CSI request trigger, generally carried in SCI.

The UE B which receives the CSI request trigger measures CSI-RS transmitted by the UE A to obtain/generate the CSI report, and then the UE B transmits the CSI report to the UE A. The CSI report may be considered as corresponding to the CSI request trigger, or being triggered and generated by the corresponding CSI request trigger.

The UE A receives the CSI report transmitted by the UE B, thereby determining the link state or link quality between the UE A and the UE B.

Therefore, according to the roles of the UE A and the UE B, it can be known that the UE A is UE which initiates the CSI request and UE which receives the CSI report, and the UE B is UE which receives the CSI request and UE which transmits the CSI report.

The address information described below may be a pair of layer-2 IDs (Layer-2 Identity, Layer-2 ID or L2ID for short), and may include a source layer-2 ID (Source Layer-2 ID) and a destination layer-2 ID (Destination Layer-2 ID).

For example, the UE A transmits data or information to the UE B, and the address to which the transmitted data or information is sent is a pair of layer-2 IDs {the source address is ID-A, and the destination address is ID-B}.

Correspondingly, if the UE B transmits data or information to the UE A, and the address to which the transmitted data or information is sent is a pair of layer-2 IDs {the source address is ID-B', and the destination address is ID-A'}.

In an ideal case, ID-B'=ID-B, ID-A'=ID-A, that is, the source address and the destination address are swapped. When the UE A, as a source, transmits data, the source address is the ID corresponding to the UE A, that is, ID-A. When the UE B, as a destination, receives data, the destination address is the ID corresponding to the UE B, that is, ID-B. In this case, by swapping the source address and the destination address, it can be easily known that when the UE B, as a source, transmits data, the source address is the ID corresponding to the UE B, that is, ID-B, and when the UE A, as a destination, receives data, the destination address is the ID corresponding to the UE A, that is ID-A.

In addition, there are also cases where ID-B' is not equal to ID-B, and ID-A' is not equal to ID-A. That is, the pair of layer-2 IDs {the source address is ID-A, and the destination address is ID-B} indicates a radio link in which the UE A serves as a transmitting end and the UE B serves as a receiving end, and the pair of layer-2 IDs {the source address is ID-B', and the destination address is ID-A'} indicates another radio link in which the UE A serves as a transmitting end and the UE B serves as a receiving end. Herein, it may be considered that the address information {the source address is ID-A, and the destination address is ID-B} and another set of address information {the source address is ID-B', and the destination address is ID-A'} have a correspondence relationship. When the UE A transmits data to the UE B according to the address {the source address is ID-A, and the destination address is ID-B}, the UE A may determine that the corresponding address {the source address is ID-B', and the destination address is ID-A'} is the address where the UE A receives data from the UE B.

In all of the above cases, the following information is clear to the UE A and the UE B:

when the UE A needs to transmit information to the UE B, the layer-2 ID carried by the UE A in the MAC PDU is {the source address is ID-A, and the destination address is ID-B};

when the UE A needs to receive information from the UE B, the UE A receives those MAC PDUs which carry the layer-2 ID {the source address is ID-B', and the destination address is ID-A'};

when the UE B needs to transmit information to the UE A, the layer-2 ID carried by the UE B in the MAC PDU is {the source address is ID-B', and the destination address is ID-A'};

when the UE B needs to receive information from the UE A, the UE B receives those MAC PDUs which carry the layer-2 ID {the source address is ID-A, and the destination address is ID-B}; and it may be considered that the two sets of address information of the layer-2 IDs {the source address is ID-A, and the destination address is ID-B} and {the source address is ID-B', and the destination address is ID-A'} are both the layer-2 ID/address information which the UE A or the UE B is interested in.

In addition, the MAC PDU may include an MAC header, and an MAC SDU and/or an MAC CE. The MAC header includes several MAC subheaders, wherein one MAC subheader is an SL-SCH subheader, and usually, the SL-SCH subheader includes address information, including a source address and a destination address. Therefore, the MAC subheader including the address information mentioned below mainly refers to this SL-SCH subheader. Of course, the address information may also be carried in other MAC subheaders, which does not affect the implementation of the solution.

Several embodiments of the present invention are described in detail below.

Embodiment 1

Provided in this embodiment is a method, performed by user equipment, for determining address information to which a CSI report belongs or corresponds.

Figure 1:
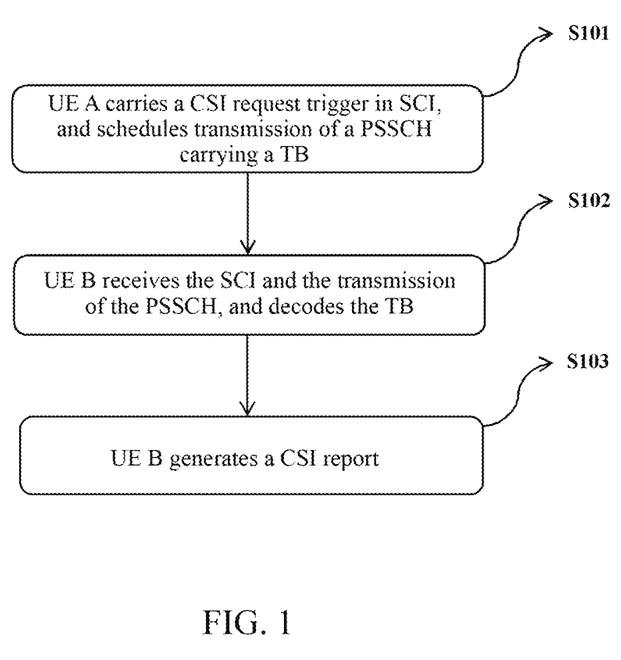
FIG. 1 is a flowchart of a method, performed by user equipment, for determining address information to which a CSI report belongs or corresponds according to an embodiment of the present invention.

In order to determine the address information to which a CSI report belongs or corresponds, a method performs determination according to a CSI request trigger for triggering the CSI report. As shown in FIG. 1. The method may specifically comprise:

Step S101: carrying, by UE A, a CSI request trigger in SCI, and scheduling transmission of a PSSCH in the SCI, that is, the SCI including time and frequency domain information for receiving the PSSCH transmission. A transfer block (TB) is carried on the PSSCH, and the TB includes an MAC PDU. An MAC subheader in this MAC PDU includes address information, including a destination address and a source address of this MAC PDU. Therefore, it may be considered that the address information corresponds to the CSI request trigger.

Step S102: receiving, by UE B, the SCI in the step S101, receiving the transmission of the PSSCH according to the information in the SCI, and decoding the TB.

If the TB is decoded successfully, that is, the UE B acquires the MAC PDU carried by the TB through decoding, the UE B may acquire address information carried by the MAC subheader in the MAC PDU, that is, the address information described in the step S101, and then associate the address information with the CSI report trigger carried in the SCI, through which operation the address information to which the CSI report trigger belongs or corresponds may be determined. Optionally, it may be considered that a CSI report trigger having corresponding address information is a valid CSI report trigger, or a pending CSI report trigger, or a not-cancelled CSI report trigger.

If the TB is not decoded successfully, that is, the UE B cannot acquire the MAC PDU carried by the TB through decoding, the UE B cannot determine the address information described in the step S101, and the UE B may determine that the CSI request trigger is an invalid CSI report trigger or cancel the CSI report trigger.

The above operation may be completed in an MAC layer of the UE B. Since the CSI request trigger is carried in the SCI, when receiving the SCI, a physical layer may indicate the CSI request trigger to an upper layer (such as the MAC layer); and after the upper layer (such as the MAC layer) receives the indication from a lower layer (such as the physical layer), the upper layer may perform the operation of step S102 when decoding the TB corresponding thereto. The corresponding TB here is the TB transmitted on the PSSCH which is scheduled by the SCI carrying the CSI request trigger as described in step S101.

Therefore, another embodiment of step S102 may be that:
when the UE B decodes the received TB, in a case that the TB has a corresponding CSI request trigger,
if the TB is not decoded successfully, the UE cancels the CSI request trigger.

If the TB is decoded successfully, the UE may determine that the CSI request trigger is valid, and may determine address information associated/bound with the CSI request trigger based on the address information in the MAC PDU carried by the TB.

The specific determination method may be using the address information in the MAC PDU carried by the TB as the address information associated/bound with the CSI request trigger.

The specific determination method may also be that when the address information in the MAC PDU carried by the TB includes a destination address and a source address, from the perspective of the UE A, if the destination address is ID-B and the source address is ID-A, from the perspective of the UE B, the destination address is ID-A and the source address is ID-B, that is, the destination address and the source address are swapped/exchanged. Then the destination address in the MAC PDU carried by the TB may be used as a source address associated/bound with the CSI request trigger, and the source address in the MAC PDU carried by the TB may be used as a destination address associated/bound with the CSI request trigger, so that the address information associated/bound with the CSI trigger is determined.

Alternatively, the corresponding address to which the UE B transmits data to the UE A is determined according to the address information in the MAC PDU carried by the TB, and the address information is used as the address information associated/bound with the CSI request trigger.

Step S103: generating, by the UE B, a CSI report, wherein address information of the CSI report is determined by the address information of the CSI request trigger corresponding to the CSI report.

The specific determination method may be: determining that the address information of the CSI report is the same as the address information of the CSI request trigger corresponding to the CSI report;

or determining the corresponding address to which the UE B transmits the CSI report to the UE A according to the address information of the CSI request trigger;

or using the destination address in the address information of the CSI request trigger as the source address of the CSI report, and using the source address in the address information of the CSI request trigger as the destination address of the CSI report;

or determining the corresponding address information according to the address information of the CSI request trigger and using the address information as the address information of the CSI report. The correspondence relationship refers to that: the address information of the CSI request trigger is the address information for the UE A to transmit data or CSI request trigger to the UE B, and for the UE B to receive the data or CSI request trigger transmitted by the UE A; and the address information of the CSI report is the address information for the UE A to receive the data or CSI report transmitted by the UE B, and for the UE B to transmit the data or CSI report to the UE A.

Embodiment 2

Provided in this embodiment is another method, performed by user equipment, for determining address information to which a CSI report belongs or corresponds.

Figure 2:
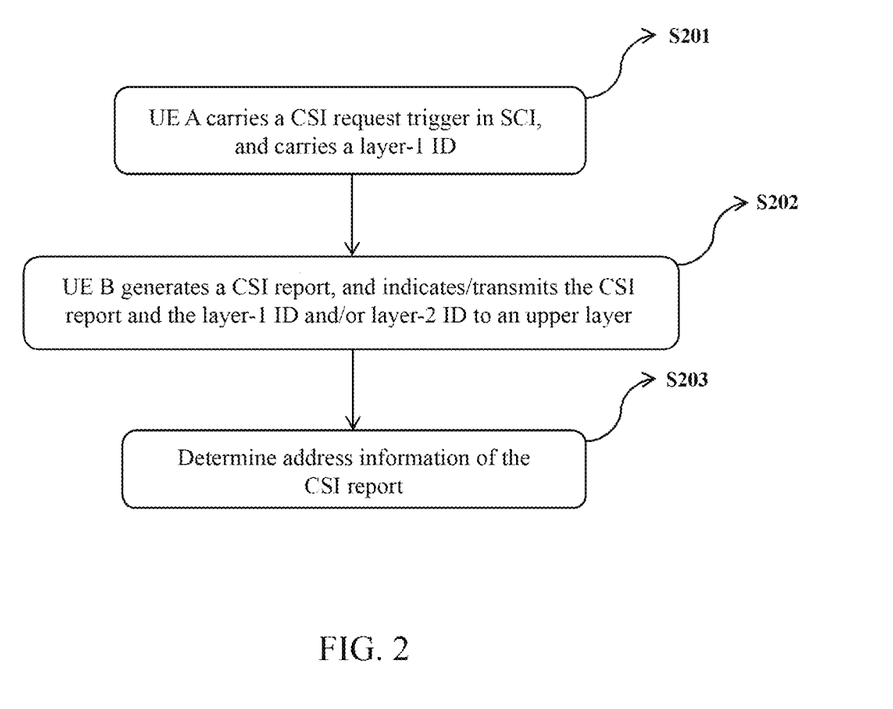
FIG. 2 is a flowchart of a method, performed by user equipment, for determining address information to which a CSI report belongs or corresponds according to another embodiment of the present invention.

In order to determine the address information to which a CSI report belongs or corresponds, determination may be performed through the layer-1 ID associated therewith. As shown in FIG. 2. The method may specifically comprise:

Step S201: carrying, by UE A, a CSI request trigger in SCI, and further carrying a layer-1 ID in the SCI.

The layer-1 ID may be configured by an RRC signaling, or may also be calculated on the basis of a layer-2 ID. Specifically, in the layer-2 ID, the source address has 24 bits and the destination address has 24 bits, then the UE may generate the layer-1 ID, wherein the source address has 8 bits and the destination address has 16 bits, the source address in the layer-1 ID may be obtained by extracting 8 bits of 24 bits of the source address in the layer-2 ID, for example, the high/low 8 bits in 24 bits are taken, and the destination address in the layer-1 ID may be obtained by extracting 16 bits of 24 bits of the destination address in the layer-2 ID, for example, the high/low 16 bits in 24 bits are taken.

It should be noted that the calculating and generating of the layer-1 ID based on the layer-2 ID may be implemented in the physical layer, or the upper layer of the physical layer, such as the MAC layer. The difference lies in that:

If the layer-1 ID is generated in the physical layer, a possible mode is that the physical layer can revert/remap the layer-1 ID into the layer-2 ID; and if the layer-1 ID is generated in the upper layer of the physical layer and is indicated to the physical layer, the physical layer cannot perform the reversion/remapping process.

Step S202: generating, by UE B, a CSI report corresponding to the CSI request trigger, and indicating/transmitting the CSI report and the layer-1 ID carried in the SCI to an upper layer, such as an MAC layer.

The CSI report is triggered and generated by the CSI request trigger, and the CSI request trigger is associated with the layer-1 ID also carried in the SCI. Therefore, the UE may identify the generated CSI report and the layer-1 ID corresponding thereto in the physical layer, and indicate the same to the upper layer.

As described in step S201, when the physical layer cannot perform the reversion process of remapping, the layer-1 ID may be directly indicated to the upper layer (such as the MAC layer), the reversion process is then performed by the upper layer, and the layer-1 ID is reverted into the layer-2 ID, so that the layer-2 ID from which the address information of the CSI report may be determined can be acquired.

Another embodiment of step S202 may also be: generating, by the UE B, a CSI report corresponding to the CSI request trigger, and indicating/transmitting the CSI report and the layer-2 ID corresponding to the layer-1 ID carried in the SCI to the upper layer, such as the MAC layer.

In this embodiment, it is considered that the physical layer can revert the layer-1 ID into the layer-2 ID. Therefore, the layer-2 ID may be directly indicated to the upper layer.

Step S203: determining address information of the CSI report based on the indicated layer-1 ID or layer-2 ID.

If the layer-1 ID is indicated, it is necessary to firstly revert/remap the layer-1 ID into the corresponding layer-2 ID. Here, both the directly indicated layer-2 ID and the layer-2 ID generated by remapping based on the indicated layer-1 ID are all referred to as the indicated layer-2 ID. Then the UE may determine the address information of the CSI report based on the indicated layer-2 ID.

The address information of the CSI report may be determined according to the indicated layer-2 ID based on the method described in step S103 of embodiment 1.

For example, the address information of the CSI report is configured to be the same as the address information of the indicated layer-2 ID.

As another example, the destination address in the address information of the indicated layer-2 ID is used as the source address of the CSI report, and the source address in the address information of the indicated layer-2 ID is used as the destination address of the CSI report.

As another example, the corresponding address information is determined according to the address information of the indicated layer-2 ID, and the address information is used as the address information of the CSI report. The correspondence relationship refers to: the address information of the indicated layer-2 ID is the layer-2 ID for the UE A to transmit data or CSI request trigger to the UE B, and for the UE B to receive the data or CSI request trigger transmitted by the UE A; and the address information of the CSI report is the layer-2 ID for the UE A to receive the data or CSI report transmitted by the UE B, and for the UE B to transmit the data or CSI report to the UE A.

If the UE can determine the layer-1 ID corresponding to the CSI report according to the layer-1 ID corresponding to the CSI report trigger, the UE may determine the layer-1 ID corresponding to the CSI report in step S202 and then indicate the layer-1 ID or the remapped layer-2 ID to the upper layer in step S203, and the upper layer uses the indicated layer-2 ID as the address information of the CSI report. The mode of determining the layer-1 ID corresponding to the CSI report according to the layer-1 ID corresponding to the CSI report trigger is the same as the mode of determining the layer-2 ID corresponding to the CSI report according to the indicated layer-2 ID, in which the destination address of the layer-1 ID corresponding to the CSI report trigger is used as the source address of the layer-1 ID of the CSI report and the source address of the layer-1 ID corresponding to the CSI report trigger is used as the destination address of the layer-1 ID of the CSI report, or the corresponding layer-1 ID is determined according to the layer-1 ID corresponding to the CSI report trigger and used as the layer-1 ID of the CSI report. The correspondence relationship refers to that: the layer-1 ID corresponding to the CSI report trigger is the layer-1 ID for the UE A to transmit data or CSI request trigger to the UE B, and for the UE B to receive the data or CSI request trigger transmitted by the UE A; and the corresponding layer-1 ID is the layer-1 ID for the UE A to receive the data or CSI report transmitted by the UE B, and for the UE B to transmit the data or CSI report to the UE A.

The above embodiment solves the problem of how to determine the address information of the CSI report or the CSI report MAC CE. Then the generation of the CSI report MAC CE may be solved.

Embodiment 3

Embodiment 3 may be combined with steps S101 and S102 in embodiment 1. When the UE determines that there is at least one CSI request trigger that is valid or not cancelled through step S102 in embodiment 1, or determines that there is at least one valid CSI request trigger in other ways, when an MAC entity of the UE acquires a sidelink resource for the first transmission or a new transmission and an address that the resource can use for transmission is the same as or corresponds to the address bound with or corresponding to the trigger, the UE acquires information of the CSI report corresponding to the CSI request trigger from a lower layer (such as a physical layer) and instructs a multiplexing and assembly entity to generate a CSI report MAC CE. Optionally, the CSI report MAC CE is transmitted.

It should be noted that when the address information bound with or corresponding to the CSI request trigger includes a destination address and a source address, from the perspective of the UE A, if the destination address is ID-B and the source address is ID-A, then for the UE B which transmits the CSI report to the UE A, the destination address should be ID-A and the source address should be ID-B. Then for "an address that the resource can use for transmission," from the perspective of the UE B, the destination address should be ID-A and the source address should be ID-B.

When the address information bound with or corresponding to the CSI request trigger indicates that the destination address is ID-B and the source address is ID-A, it may be considered that the address information bound with or corresponding to the CSI request trigger corresponds to "an address that the resource can use for transmission". If the address information bound with or corresponding to the CSI request trigger indicates that the destination address is ID-A and the source address is ID-B, it may be considered that the address information bound with or corresponding to the CSI request trigger corresponds to "an address that the resource can use for transmission". The correspondence relationship refers to that: the address information corresponding to the CSI report trigger is the address information for the UE A to transmit the data or CSI request trigger to the UE B, and for the UE B to receive the data or CSI request trigger transmitted by the UE A; and the corresponding address information is the address information for the UE A to receive the data or CSI report transmitted by the UE B, and for the UE B to transmit the data or CSI report to the UE A.

Embodiment 4

After the UE determines the address information corresponding to the CSI report through embodiment 1 or embodiment 2 or in other ways not mentioned herein, the UE needs to indicate the address information corresponding to the CSI report while generating the CSI report and indicating/transmitting the CSI report to an upper layer; and when the upper layer (such as an MAC layer) receives the CSI report indicated by the lower layer, a multiplexing and assembly entity is instructed to generate a CSI report MAC CE. The address information corresponding to the MAC CE is the address information indicated together with the CSI report.

Embodiment 5

When the UE performs sidelink communication or V2X communication, a lot of data may need to be sent to different addresses. The data sent to different addresses cannot be multiplexed in the same MAC PDU. Therefore, when the UE acquires the sidelink/V2X resource, an address that the resource can use for transmission is firstly determined.

A possible solution is that: when the UE acquires the sidelink/V2X resource, if the UE needs to transmit a CSI report or a CSI report MAC CE to a certain address, or if there is a CSI report trigger that is valid or not cancelled and an address corresponding thereto is the same as or corresponds to the certain address, the certain address may be used as a candidate address of the resource. This address may be simply referred to as the address with the CSI report to be transmitted.

Further, if the UE also needs to transmit service data to a certain address, the service data respectively belongs to one or a plurality of logical channels and each logical channel has a logical channel priority corresponding thereto, the highest priority may be selected as the priority corresponding to the certain address. If there are several addresses to which service data needs to be transmitted, the corresponding address with the highest priority is selected as a candidate address of the resource according to the priorities corresponding to the respective addresses. It should be noted that the highest priority may correspond to the lowest value of priority, for example, if the priority values of the logical channels are respectively 1 and 3, the priority of the logical channel with the value of 1 is higher than the priority of the logical channel with the value of 3, and the priority of the logical channel with the priority value of 1 may correspond to the priority of the address, that is, the priority value of the address is 1.

When the above two types of candidate addresses exist, that is, one is the address with the CSI report to be transmitted, and the other one is the address with the highest priority, the transmission address of the resource is determined by the following three modes:

Mode 1: when the above two types of candidate addresses exist, the UE always uses the address with the CSI report to be transmitted as an address the resource uses for transmission. That is, only when there is no address with the CSI report to be transmitted, the UE selects the address with the highest priority as the transmission address of the resource.

Mode 2: when the above two types of candidate addresses exist, the UE always uses the address with the highest priority as the transmission address of the resource. That is, only when there is no serve data to be transmitted, the UE selects the address with the CSI report to be transmitted as the address the resource uses for transmission.

Mode 3: a priority threshold is preset or pre-configured, when the priority value corresponding to the address with the highest priority is less than (or greater than) the priority threshold, the UE selects the address with the highest priority as the transmission address of the resource; otherwise, when the priority corresponding to the address with the highest priority is greater than (or less than) the threshold, the UE selects the address with the CSI report to be transmitted as the address the resource uses for transmission.

Through this embodiment, the UE may select the transmission address of the sidelink resource, and the operation described in embodiment 3 may be performed when the CSI report is present at the address, thereby realizing transmission of the CSI report.

Embodiment 6

After the UE selects the transmission address of the sidelink resource according to embodiment 5 or other modes not mentioned herein, the UE may package the MAC PDU. When the address has both CSI report MAC CE and data to be transmitted, there is another problem of how to determine the sequence of packaging. Here, a possible solution is that: after the UE determines the resource for transmission in a certain address, if the certain address has both CSI report MAC CE and data from the logical channel to be transmitted, when an MAC PUD packet is formed, the priority of the CSI report MAC CE is always higher than that of the data from the logical channel group. For example, the UE firstly reserves a space for the CSI report MAC CE on the resource, or firstly fills the transmission resource with the content/bit stream of the CSI report MAC CE, then acquires data according to the priorities of the logical channels or the logical channel groups sequentially from high to low, and performs packaging and filling until all the resource space is used up.

In a special case, for example, the priority of some logical channels is very high, in order to meet the priority transmission of the data on such logical channels, a threshold may be set, this threshold may be pre-configured by a network side or a base station in the configuration information transmitted to the UE or system information of broadcasting, and the UE receives the configuration information or the system information. When the priority value of a certain logical channel is less than the threshold, the transmission resource is preferentially filled with data from the logical channel, and if there are multiple logical channels having the values less than the threshold, filling is performed according to the priorities of these logical channels sequentially from high to low until all data is filled or there is no more space. After all the data of these logical channels is filled, if there is any more space, the CSI report MAC CE is filled. Then, if there is still space, data from other logical channels is filled, and the priorities of these other logical channels are higher than the threshold. Herein, it is assumed that a high priority corresponds to a low or small priority value.

Embodiment 7

Since addition configuration is present in the sidelink resource, for example, the HARQ function of the sidelink resource may be activated/enabled, or may be deactivated/disabled, then can the MAC PDU carrying the CSI report MAC CE be transmitted on such resource?

One way is that regardless of whether the sidelink resource enables the HARQ function, the sidelink resource may be used as the source for transmitting the MAC PDU carrying the CSI report MAC CE. Then, it is unnecessary to consider the HARQ function during address selection, but the address is selected according to the mode in embodiment 5.

If the MAC PDU carrying the CSI report MAC CE only can be transmitted on the resource enabling the HARQ function, it is also necessary to consider whether the sidelink resource enables the HARQ function when address selection is performed. The specific operation is as follows:

If the sidelink resource acquired by the UE enables the HARQ function, the UE uses both the address with the CSI report to be transmitted and the address with data from logical channels as candidates addresses for address selection, and address selection is performed according to the mode in embodiment 5.

If the sidelink resource acquired by the UE disables the HARQ function or does not enable the HARQ function, the address with the CSI report to be transmitted cannot be used as the candidate address for address selection, that is, only the addresses including the data from the logical channels can be used as the candidate addresses for address selection, and the address finally used for the resource transmission is selected/determined from these address according to the priorities.

The enabled HARQ function here refers to that: for the transmitted MAC PDU, the receiving UE needs to transmit positive acknowledgment (ACK) or negative acknowledgment (NACK) confirmation information as feedback, and the transmitting UE needs to receive the feedback ACK/NACK confirmation information, thereby determining whether it is necessary to perform retransmission of the MAC PDU.

The sidelink resource enabling the HARQ function refers to that: when the UE transmits the TB or MAC PDU on the sidelink resource which enables the HARQ function, the receiving UE needs to transmit the confirmation information of positive acknowledgment (ACK) or negative acknowledgment (NACK) as feedback of whether the MAC PDU is decoded correctly on a PSFCH resource bound with or corresponding to the resource, and the transmitting UE needs to receive the confirmation information of ACK/NACK regarding whether the MAC PDU is decoded correctly on the corresponding PSFCH resource and determine whether it is necessary to perform retransmission of the MAC PDU based on the confirmation information.

Embodiment 8

There may be more than one address with the CSI report to be transmitted in the implementation process of embodiment 5, then the question is how to determine the final address for transmission from these addresses. Here, taking the case where at least two addresses have the CSI report to be transmitted as an example, including address 1 and address 2, there may be three operation modes as follows.

Mode 1: determination is performed according to the priorities of the logical channels to which data to be transmitted at the two addresses belongs.

For example, when the address 1 and the address 2 both have the CSI report to be transmitted, the UE will further determine whether the two addresses have data to be transmitted.

It is assumed that the address 1 has data to be transmitted and the value of the priority of the logical channel to which the data belongs is X, and the address 2 also has data to be transmitted and the value of the priority of the logical channel to which the data belongs is Y. Here, it is assumed that the higher the value, the lower the priority. Then when X<Y, it means that the priority of the data to be transmitted at the address 1 is higher than the priority of the data to be transmitted at the address 2, and the address 1 is selected as the final transmission address.

Mode 2: determination may also be performed according to whether the two addresses have data to be transmitted.

As another example, the address 1 has data to be transmitted and the value of the priority of the logical channel to which the data belongs is X, and the address 2 does not have data to be transmitted and only has the CSI report to be transmitted. Then the UE selects the address 2 which only has the CSI report to be transmitted as the final transmission address.

As another example, the address 1 has data to be transmitted and the value of the priority of the logical channel to which the data belongs is X, and the address 2 does not have data to be transmitted and only has the CSI report to be transmitted. Then the UE selects the address 1 which has both the CSI report and the data to be transmitted as the final transmission address.

The mode 2 may serve as a special implementation mode of the mode 1. When the address 2 does not have the data to be transmitted and only has the CSI report to be transmitted, it may be considered that at this time, the value of the priority of the data at the address 2 is greater than the value of the priority of any logical channel, then according to the operation of the mode 1, the UE selects the address with higher priority (smaller value) as the final transmission address. Since the priority of the data to be transmitted at the address 1 is higher than the priority of the data to be transmitted at the address 2, the address 1 is selected as the final transmission address.

Alternatively, when the address 2 does not have data to be transmitted and only has the CSI report to be transmitted, it may be considered that at this time, the value of the priority of the data at the address 2 is less than the value of any logical channel, then according to the operation of the mode 1, the UE selects the address with higher priority (smaller value) as the final transmission address. Since the priority of the data to be transmitted at the address 2 is always higher than the priority of the data to be transmitted at the address 1, the address 2 is selected as the final transmission address.

Mode 3: the final address may be determined according to the generation time of the CSI report.

If both the address 1 and the address 2 have the CSI report to be transmitted, the address can be selected according to the generation time of the CSI report.

For example, the CSI report of the address 1 is generated at a time slot N or is received by an upper layer (such as an MAC layer) at the time slot N, and the CSI report of the address 2 is generated at a time slot N+1 or is received by the upper layer (such as the MAC layer) at a time slot N+1, which is later than the generation/receiving time of the CSI report of the address 1, then the UE selects the address with the later generation/receiving time of the CSI report or the address with the most recent generation/receiving time of the CSI report as the final transmission address, that is, the address 2. "Most recent" here may refer to the time closest to the generation time of the MAC PDU, or the time closest to the transmission time of the MAC PDU by the sidelink resource, especially the starting time of transmission. The timeliness of the CSI report is mainly considered here. Of course, the address with the earlier generation or receiving time of the CSI report may be selected as the final transmission address, that is, the address 1. This is considered from the perspective of transmitting the CSI report as soon as possible. "Earlier" here refers to that through comparing the generation/receiving time of the CSI report with the generation time of the MAC PDU or the transmission time of the MAC PDU by the sidelink resource, especially the starting time of transmission, the CSI report with the longer time interval is regarded as the earlier CSI report.

Similarly, the address can be selected according to the receiving time of the CSI request trigger corresponding to the CSI report.

If both the address 1 and the address 2 have the CSI report to be transmitted, the address can be selected according to the receiving time of the CSI request trigger corresponding to the CSI report. For example, the CSI request trigger corresponding to the CSI report of the address 1 is received at a time slot N, and the CSI request trigger corresponding to the CSI report of the address 2 is received at a time slot N+1, which is later than the receiving time of the CSI request trigger of the address 1, then the UE selects the address of the CSI report with the later receiving time of the CSI request trigger, or the address with the most recent receiving time of the CSI request trigger as the final transmission address, that is, the address 2. "Most recent" here may refer to the time closest to the generation time of the MAC PDU, or the time closest to the transmission time of the MAC PDU by the sidelink resource, especially the starting time of transmission. The timeliness of the CSI report is mainly considered here. Of course, the address of the CSI report corresponding to the earlier received CSI report trigger may be selected as the final transmission address, that is, the address 1. This is considered from the perspective of transmitting the CSI report as soon as possible. "Earlier" here refers to that through comparing the receiving time of the CSI report trigger with the generation time of the MAC PDU or the transmission time of the MAC PDU by the sidelink resource, especially the starting time of transmission, the CSI report trigger with longer time interval is regarded as the earlier CSI report trigger.

The above three operation modes may be used alone or may be used in combination. For example, when both addresses have data to be transmitted, the mode 1 is adopted; when both addresses do not have data to be transmitted and only have the CSI report to be transmitted, the mode 3 is adopted; and when one address has data to be transmitted, and the other address does not have data to be transmitted and only has the CSI report to be transmitted, the mode 2 or the special implementation mode of the mode 1 is adopted.

Since the CSI report has a valid period, the content of the CSI report cannot be used for reference after a certain period of time. Such a CSI report needs to be discarded. Since the CSI report may be discharged by the transmitting UE, that is, the UE B, or may also be discarded by the receiving UE, that is, the UE A, there may be three implementation modes (that is, embodiment 9, embodiment 10 and embodiment 11) of discarding the CSI report as follows.

Embodiment 9

The CSI report is discarded at the receiving UE side, that is, the expired CSI report is discarded by the UE A.

Mode 1

A receiving window or a timer is configured in a physical layer of UE A. When the SCI transmitted by the UE A includes information of the CSI request trigger, the receiving window or the timer is started. Alternatively, when the UE A completes transmitting a CSI-RS signal, the receiving window or the timer is started. The receiving window or timer started in this way is associated with the layer-1 ID included in the SCI carrying the CSI request trigger.

When the UE A receives a CSI report MAC CE, address information associated with the CSI report MAC CE is determined, or address information associated with the CSI report included in the CSI report MAC CE is determined.

The specific determination mode may be that:

the address information is the address information carried in a subheader of an MAC PDU including the CSI report MAC CE.

Alternatively, the address information is a layer-1 ID which is mapped/generated according to the address information in the subheader of the MAC PDU. The specific mapping mode or generation mode is shown in embodiment 2.

Then the MAC layer indicates the related content of the CSI report included in the CSI report MAC CE and the determined address information associated with the CSI report to a lower layer (such as a physical layer).

Based on the address information, the UE determines the corresponding receiving window or timer. If the upper layer indicates the address information carried in the subheader of the MAC PDU including the CSI report MAC CE, the physical layer needs to map the address information to the layer-1 ID first. If the layer-1 ID is directly indicated, the corresponding receiving window or timer may be determined according to the layer-1 ID. If the receiving window or timer has stopped or timed out, the CSI report is discarded. If the receiving window or timer is still running, the receiving window or time is stopped. The CSI report in this case may be used to evaluate and determine the link quality.

As mentioned above, from the perspective of the UE B, when the CSI report MAC CE is transmitted, the destination address should be ID-A and the source address should be ID-B; and from the perspective of the UE A, when the CSI request trigger is transmitted, the destination address is ID-B and the source address is ID-A, and the layer-1 ID associated with the receiving window or timer is acquired according to {the destination address is ID-B and the source address is ID-A}. Therefore, when the UE A receives the CSI report, determination of the address information associated with the CSI report may be that:

the address information associated with the CSI report is configured as the address information carried in the subheader of the MAC PDU including the CSI report MAC CE, that is, {the destination address is ID-A and the source address is ID-B}; or based on the address information {the destination address is ID-A and the source address is ID-B} in the subheader of the MAC PDU, the address information associated with the CSI report is determined as {the destination address is ID-B and the source address is ID-A} and then is sent to the lower layer; or the source address in the address information {the destination address is ID-A and the source address is ID-B} in the subheader of the MAC PDU may also be used as the destination address, and the destination address therein may be used as the source address, after such swap, the address information is mapped to the layer-1 ID and then sent to the lower layer; or according to the address information {the destination address is ID-A and the source address is ID-B} carried in the subheader of the MAC PDU including the CSI report MAC CE, the address information corresponding thereto is determined, mapped to the layer-1 ID and then sent to the lower layer together with the content of the CSI report. The correspondence relationship refers to that: the address information of the CSI request trigger is the address information for the UE A to transmit data or CSI request trigger to the UE B, and for the UE B to receive the data or CSI request trigger transmitted by the UE A; and the address information of the CSI report is the address information for the UE A to receive the data or CSI report transmitted by the UE B, and for the UE B to transmit the data or CSI report to the UE A.

When the address information received by the physical layer is {the destination address is ID-A and the source address is ID-B}, the physical layer may use the source address of the address information as the destination address and use the destination address thereof as the source address, after such swap, the address information is mapped to the layer-1 ID and then a search is performed for the corresponding receiving window or timer. It may also be the case in which: the received address information is mapped to the layer-1 ID firstly, then the source address of the layer-1 ID is used as the destination address and the destination address thereof is used as the source address, and a search is performed for the corresponding receiving window or timer.

Mode 2

A receiving window or a timer is configured in an MAC layer of UE A.

When the CSI request trigger is transmitted or transmission of the CSI-RS is completed, the lower layer needs to indicate to the MAC layer that the CSI request is triggered. Based on the received indication that the CSI request is triggered, the MAC layer starts the receiving window or timer.

Since the SCI carrying the CSI request trigger also schedules the transmission of a PSSCH, when the MAC PDU transmitted on the PSSCH is generated, it is necessary to determine the address information of this MAC PDU. Therefore, the MAC layer may associate this CSI request trigger with the corresponding address information. That is, when the UE indicates the CSI request trigger in the SCI, this trigger is associated with the address information of the MAC PDU transmitted on the SL grant/PSSCH scheduled by the SCI, and the receiving window or timer is started.

When a CSI report MAC CE is received, the address information corresponding to the CSI report MAC CE is determined by the method mentioned in the mode 1 in this embodiment, and a search is performed for the corresponding receiving window or timer according to the address information. If the receiving window or timer has stopped or expired, the CSI report MAC CE is discarded. If the receiving window or timer is running, the receiving window or timer is stopped, and the related content of the CSI report carried in the CSI report MAC CE is delivered to the lower layer (such as the physical layer).

Preferably, the CSI report MAC CE also carries information related to the CSI-RS, such as time or frequency information, and the MAC layer indicates the information along with the CSI report to the lower layer.

The MAC layer may also deliver the address information corresponding to the CSI report to the lower layer while delivering the related content of the CSI report to the lower layer. The address information may be determined with reference to the method in the mode 1.

Embodiment 10

The CSI report is discarded at the UE side which transmits the CSI report, that is, the expired CSI report is discarded by the UE B.

When the UE B receives the CSI request trigger indicated by the lower layer or the CSI report indicated by the lower layer, or when the UE B generates the CSI report MAC CE, a transmission window or timer associated therewith is started.

When the transmission window or timer has expired:
  if the CSI request trigger associated with the transmission window or timer still exists or is in a pending state, the CSI request trigger is cancelled;
  if the CSI report associated with the transmission window or timer and indicated by the lower layer has not been instructed to generate the CSI report MAC CE, the CSI report is discarded;
  if the CSI report MAC CE associated with the transmission window or timer has been generated, but the MAC PDU has not been packaged and generated, the CSI report MAC CE is discarded; and
  if the CSI report MAC CE associated with the transmission window or timer has been carried in a MAC PDU, but the MAC PDU has not been transmitted, the MAC PDU is discarded. Preferably, when the MAC PDU only includes the CSI report MAC CE, that is, the MAC PDU does not include other data, such as MAC SDU, the MAC PDU is discarded, otherwise, if the MAC PDU includes the MAC SDU in addition to the CSI report MAC CE, the MAC PDU is not discarded.

When the transmission window or timer is running and the CSI report MAC CE associated therewith is carried in the MAC PDU for transmission, the transmission window or timer is stopped.

Embodiment 11

The CSI report described in embodiments 1-10 may at least include a channel quality indicator (CQI) or a rank indicator (RI).

Optionally, time information associated with CQI/RI, such as a time slot, or frequency information, such as carrier information and bandwidth part information may also be carried.

For example, the UE performs measurement on the time slot N, and performs evaluation or calculation according to the measurement result to obtain the value of the CQI/RI, the corresponding time may be reported to be the time slot N at the same time when the CQI/RI is reported. Alternatively, the UE performs measurement on a carrier numbered as X and performs evaluation or calculation according to the measurement result to obtain the value of the CQI/RI, the corresponding frequency may be reported to be carrier X at the same time when the CQI/RI is reported.

Optionally, the information of the CSI request trigger may also be carried. For example, the UE receives the CSI request trigger on the time slot N, the time information of the CSI request trigger, such as the time slot N, may be carried in the CSI report MAC CE triggered by the CSI request trigger. As another example, the UE receives the CSI request trigger on carrier X, the frequency information of the CSI request trigger, such as carrier X, may be carried in the CSI report MAC CE triggered by the CSI request trigger.

Alternatively, the received CSI request trigger may carry an index/serial number/number, then the index/serial number/number of the CSI request trigger may be carried in the CSI report MAC CE triggered by the CSI request trigger.

With the time information and/or frequency information or the index information, the UE which receives the CSI report may determine when the measurement for obtaining the CSI report is performed. If the valid time is exceeded, the CSI report may be discarded.

Figure 3:
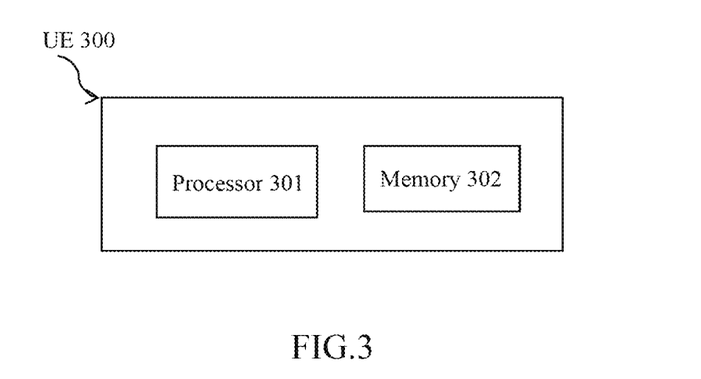
FIG. 3 is a schematic structural block diagram of user equipment (UE) related to the present invention.

FIG. 3 is a schematic structural block diagram of user equipment (UE) related to the present invention. As shown in FIG. 3, the UE 300 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. The instructions, when run by the processor 301, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. User equipment (UE), comprising:
   a processor; and
   a memory in electronic communication with the processor, wherein the processor is configured by instructions stored in the memory to cause the UE to:
   start a timer in response to triggering of a Channel State Information (CSI) report by a CSI request trigger received in Sidelink Control Information (SCI);
   in a case that the timer expires, cancel triggering of the CSI report when the timer expires; and
   in a case that the UE makes a determination that a Medium Access Control (MAC) Protocol Data Unit (PDU) for transmission carries a CSI report MAC Control Element (CE), stop the timer in response to the determination, wherein
   the timer is associated with the CSI request trigger; and
   the timer expires after a valid period of the CSI report.

2. A method performed by user equipment (UE), the method comprising the following steps of:
   starting a timer in response to triggering of a Channel State Information (CSI) report by a CSI request trigger received in Sidelink Control Information (SCI);
   in a case that the timer expires, cancelling triggering of the CSI report when the timer expires; and
   in a case that the UE makes a determination that a Medium Access Control (MAC) Protocol Data Unit (PDU) for transmission carries a CSI report MAC Control Element (CE), stopping the timer in response to the determination, wherein
   the timer is associated with the CSI request trigger; and
   the timer expires after a valid period of the CSI report.

* * * * *